Dec. 31, 1957 W. M. ASHLEY, JR 2,818,311
HYDRAULIC TRACK TENSIONING APPARATUS FOR CRAWLER
TYPE LAND VEHICLES
Filed March 19, 1956 3 Sheets-Sheet 2
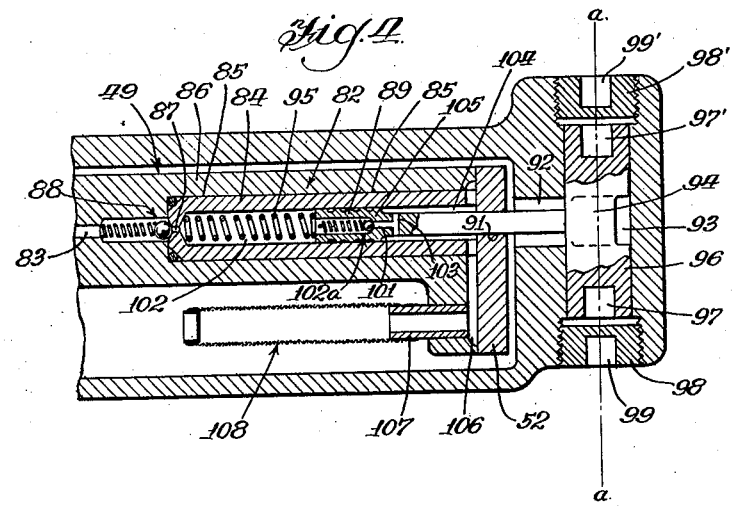
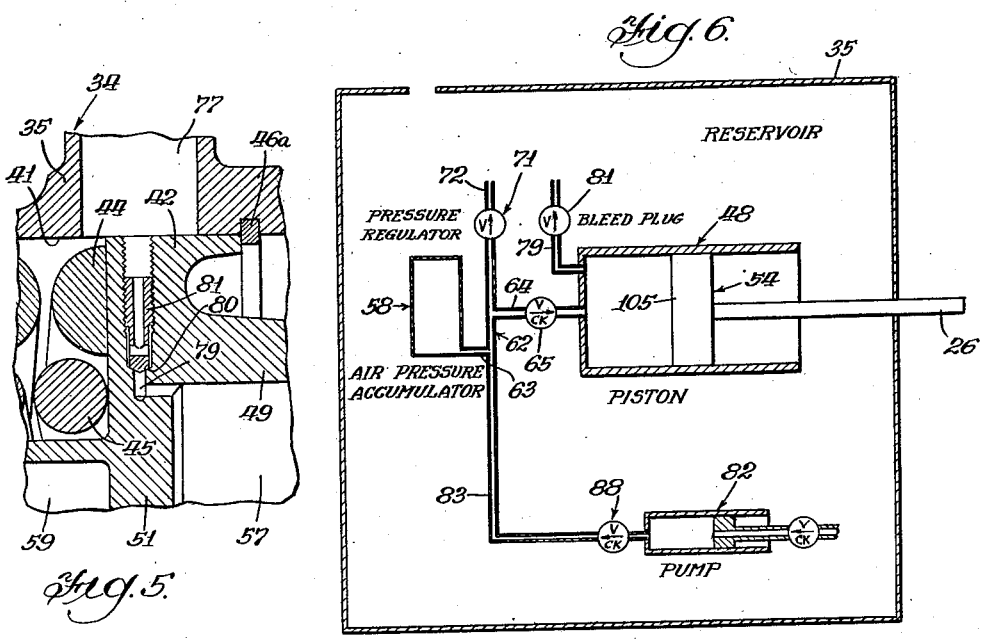
Inventor:
Walter M. Ashley, Jr.
Paul O. Pippel
Atty.

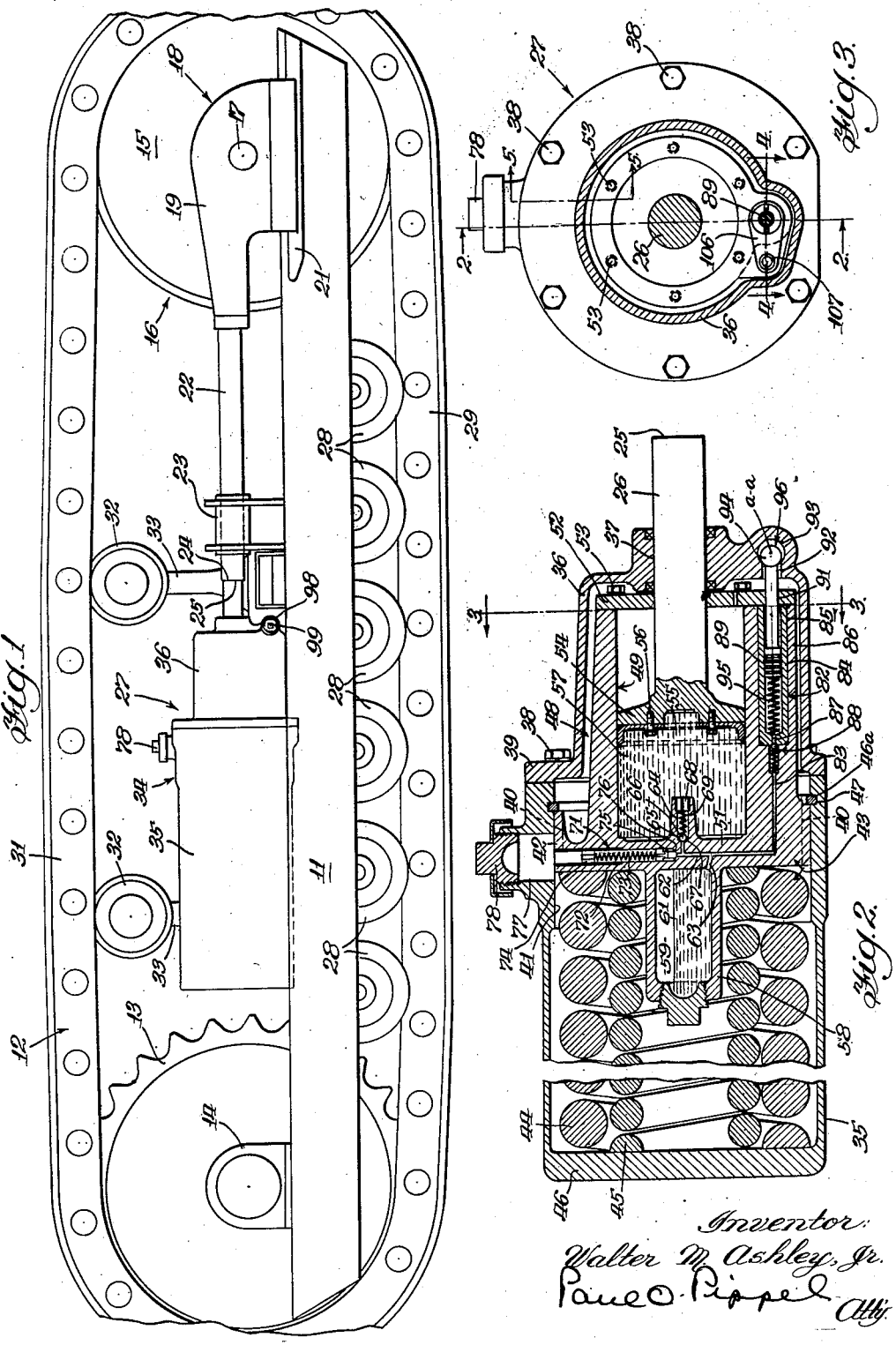

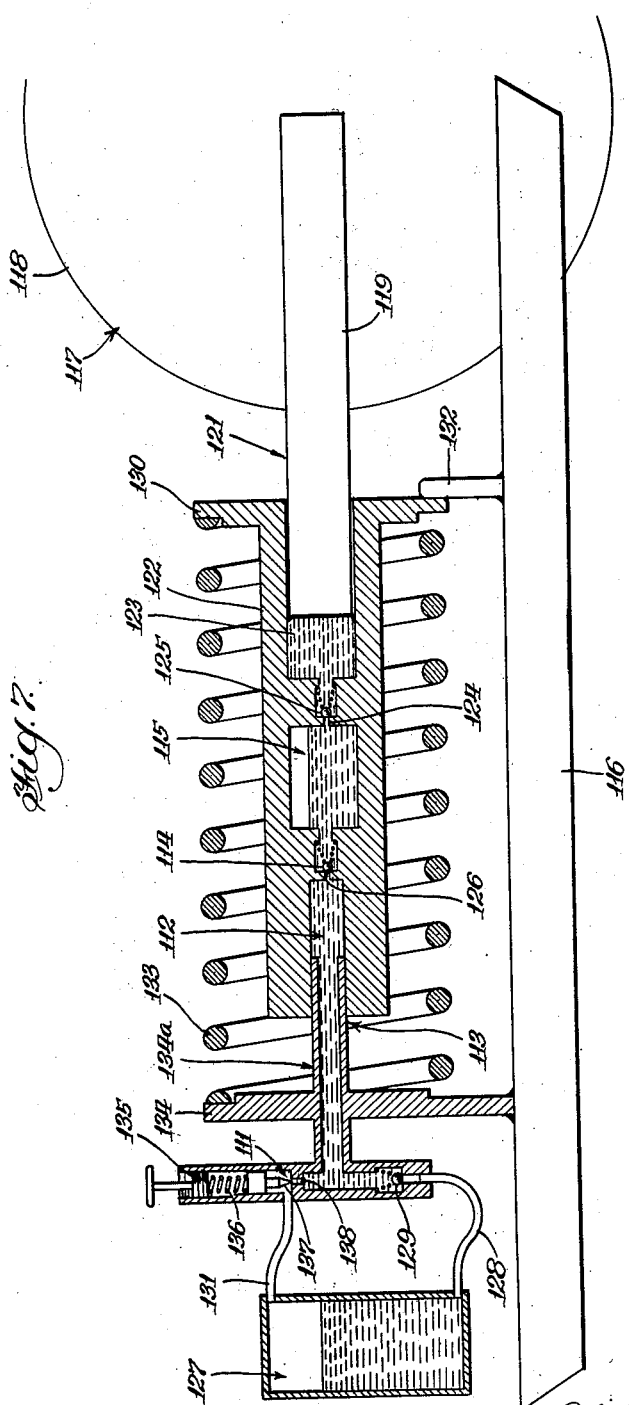

United States Patent Office 2,818,311
Patented Dec. 31, 1957

2,818,311

HYDRAULIC TRACK TENSIONING APPARATUS FOR CRAWLER TYPE LAND VEHICLES

Walter M. Ashley, Jr., Glen Ellyn, Ill., assignor to International Harvester Company, a corporation of New Jersey Application March 19, 1956, Serial No. 572,350

13 Claims. (Cl. 305—10)

This invention concerns crawler type land vehicles wherein there are track frames having endless tracks and more particularly relates to improvements in apparatus for adjusting the tension or the amount of slack in the tracks. A species of such apparatus is illustrated in U. S. Patent No. 2,716,577 issued August 30, 1955 to H. A. Land.

The so-called crawler vehicle normally embodies track supporting frames extending fore and aft on opposite sides of the vehicle body. These track frames provide support for flexible endless self-laying tracks in the form of elongated loops which revolve respectively about such frames. Driving force is imparted to each track loop by a large driving sprocket which is normally within the rear end of the track loop, while an idler wheel normally provides support for the front end of the track which is looped or trained about this idler wheel. Desired tautness or limitation of slack in the track loop is provided for by mounting an assembly including the idler wheel and a bearing head slidable endwise upon the track frame and operable in conjunction with a captive track-frame spring unit mounted on the frame rearwardly of the idler assembly and against which such assembly reacts through an elongatively adjustable structure to normally retain the idler in a selected forwardly projected position. The track-frame spring unit amounts to an overload release mechanism to permit retraction of the idler wheel and thereby prevent over-tension in the track and possible injury or breakage thereof by an expansion force which might be caused by a stone or other non-compressible object becoming accidentally wedged between the track and any of the carrying parts therefor.

Deterioration of crawler tracks through normal wear is an important item in the maintenance cost of crawler vehicles. Such wear is significantly diminished by maintaining a proper tension or limitation of slack in the track. As wear occurs in the track articulations and in the driving sprocket and track rollers, the track decreases its tension. Reestablishment of the desired tension is conventionally obtained by manipulation of an elongatively adjustable thrust structure interposed between the idler wheel bearing head and the over-load release of track frame spring unit. To encourage tractor operators making the adjustment necessary to maintain the proper track tension at frequent intervals, manufacturers of this equipment have endeavored to improve the convenience and diminish the task of making the adjustment. Despite these efforts of manufacturers, the making of such adjustments has been somewhat tedious and time-consuming, and because of this and sometimes because of over-sight, tractor operators have not always operated the machines with proper track tensioning.

The principal object of this invention is the provision of mechanism for automatically maintaining a selective tension on crawler tractor tracks. This makes it possible for a fleet operator or contractor to determine the tension desired in the tracks of his crawler vehicles and to be assured this tension will be maintained irrespective of inattention of employe drivers of the tractors.

A more specific object of this invention is the provision of a novel track tensioning apparatus including an hydraulic ram disposed in thrust relation between the track idler and an elastically displaceable force reaction means or over-load release mechanism on the track frame, together with an hydraulic fluid accumulator communicative with the fluid containing chamber of the hydraulic ram, together with pump means for maintaining a desired pressure of fluid in the accumulator and, consequently, in the ram to maintain a desired correlated tension in the track.

A further object is the provision of a reservoir for hydraulic fluid and a pump communicative between the reservoir and the accumulator, and the pump being operable in response to reciprocatory excursions of the ram attendant to retraction of the idler assembly incurred by transient conditions of over-tension in the track. Such transient over-tension in the track is sometimes incurred by the lodging of a non-compressible object between the track and its driving sprocket or one of the track rollers, as explained above, although such over-tension more frequently occurs when the driving sprocket for the track is driven reversely under conditions offering considerable resistance to rearward travel of the vehicle to create inordinate tautness in the upper flight of the track and its consequent pull-back on the front idler.

The above and other specific objects inherent in and encompassed by the invention are elucidated in the ensuing description, the appended claims and the annexed drawings, wherein:

Figure 1 is a schematic side elevational view of a crawler tractor track frame and endless track loop partially broken away at its ends, together with parts carried by the frame including track-tensioning apparatus, also shown in side elevation, and constituting a preferred embodiment of the present invention.

Figure 2 is a longitudinal sectional view of the track-tensioning apparatus of Figure 1, shown to an enlarged scale and with an intermediate portion of a force-reaction spring means and chamber therefor broken away to diminish the length of the figure.

Figure 3 is a transverse sectional view taken on the line 3—3 of Figure 2.

Figure 4 is an enlarged scale fragmentary sectional view taken at the plane indicated by the line 4—4 in Figure 3.

Figure 5 is an enlarged scale fragmentary sectional view taken at the plane indicated by the line 5—5 in Figure 3.

Figure 6 is a diagrammatic view, diagrammatically illustrating the principal parts of the invention and for clarifying the principle of operation thereof.

Figure 7 is a schematic view of a second species of the invention.

With continued reference to the drawings and particularly to Figure 1, one of the two track frames for respective opposite sides of a crawler vehicle is there designated 11. A diagrammatically illustrated endless track 12 which revolves around the track frame 11 is trained at its rear end about a driving sprocket 13 which is rotatively supported by a bearing bracket 14 mounted on the track frame. The front end of the looped track 12 is trained over and guided by a track idler wheel 15 of a track idler assembly 16 which comprises an axle shaft 17 for the idler 15 supported in a bearing head 18 having furcations 19, one being shown, which are on opposite sides of the idler. These bearing head furcations 19 are slidable fore and aft upon a slide bearing portion 21 of the track frame. A thrust rod 22 extending rearwardly from the bearing head 18 of the assembly 16 is guided fore and aft in a bearing 23 on the track frame. The rear end 24 of thrust rod 22 abuts against the front end 25 of a hydraulic ram plunger stem 26 of track tensioning apparatus 27 also mounted on the track frame 11. The desired amount of tension in the track 12 is obtained by energizing the track tensioning apparatus 27 to project the thrust rod 22 and the front idler assembly 16 selectively forwardly.

The track frame 11 and all parts mounted thereon is supported by a plurality of track rollers 28 journaled upon such frame for rolling along the upper surface of the lower ground-engaging flight 29 of the track 12. The upper flight 31 of the track is supported against sagging by track supporting roller 32 rotatively mounted upon track frame supporting brackets 33 therefor.

The track tensioning apparatus 27 comprises a reservoir casing 34 securely anchored to the track frame 11. This casing comprises a combined spring chamber 35 and is closed at its right end by a bonnet-like cover member 36 having a bearing 37 therein for the plunger stem 26; see Figure 2. A circle of cap screws 38 secure a flange 39 of the cover 36 to the right end of the spring chamber. Axial grooves 40 spaced circumferentially about the element 42 provided communication between opposite ends of the reservoir casing 34. A cylindrical inner peripheral portion 41 of the spring chamber 35 slidably receives a piston-like element 42 of a force-reaction structure 43. Other elements of this force-reaction structure are concentric helical springs 44 and 45 axially compressed by and held captive between an end wall 46 of the spring chamber and the piston-like element 42. Forward movement of the element 42, that is, rightward movement of this element as viewed in Figure 2, under the force of the compressed force-reaction means 44, 45 is limited by stop means in the form of a snap ring 46a disposed within an internal groove 47 circumscribing the inner periphery 41 of the spring chamber.

A hydraulic ram 48 comprises a cylinder 49 projecting forwardly from the force-reaction structure element 42 and formed integrally with such element wherefore the head end 51 of such cylinder is formed by a portion of the element 42. The rod end of the cylinder 49 is formed by a plate 52 held to the right end thereof by cap screws 53. A plunger 54 of the ram has the plunger stem 26 projecting forwardly therefrom and comprises a conventional cupped sealing element 55 secured to its end face by cap screws 56. Between the plunger 54 and the head wall 51 of the ram cylinder is a fluid-containing chamber 57 which is normally completely filled with fluid, as illustrated in Figure 2.

On the left or outer side of the ram cylinder head wall 51 there is formed an hydraulic accumulator 58 nested concentrically with the helical springs 44 and 45. This accumulator has a body of gas 59 trapped therein above the fluid level line 61. Communication is provided for between the accumulator 58, at a point below the fluid level 61 therein, and the fluid-containing chamber 57 of the ram 48 by a transfer passage 62 which comprises a lateral passage 63 leading into the accumulator and a lateral passage 64 leading into the ram chamber. A check valve 65 in the passage 64 comprises a spring pressed ball 66 seatable upon a valve seat 67 therefor. A threaded axially fluted reaction plug 68 for the valve spring 69 is turned in the passage 64.

Pressure limiting means in the form of a valve 71 is disposed within a radial passage 72 adapted to communicate through such valve with the transfer passage 62 and thence with the accumulator 58 through the lateral passage 63. A spring 73 reacting against a fluted screw plug 74 in the passage 72 urges a valve member 75 onto a valve seat 76. When the fluid pressure in the accumulator 58 exceeds a predetermined maximum, the member 75 will be unseated against the force of the spring 73 allowing fluid to escape through the passage 72 into the casing reservoir 34. This maximum pressure can be selectively regulated by changing the position of the fluted plug 74 to change the tension of the spring 73. Access to the plug 74 is had through a side wall opening 77 of the casing 34 when a closure plug 78 for this opening is removed.

Means for venting the ram chamber 57 to facilitate filling the same with liquid fluid, and also to permit axial collapse of the ram and retraction of the idler assembly 16 attendant to removing and servicing the endless track 12, is afforded by an L-shaped passage 79, Figure 5, when a closure plug 81 therefor is unseated from 80. Plug 81 is accessible for unscrewing from the passage 79 when the closure plug 78, Figure 2, is removed from the casing side wall opening 77.

Hydraulic fluid is maintained under pressure in the accumulator 58 of a magnitude controlled by the pressure limiting means 71 and by a pump device 82, Figures 2 and 4, which communicates with the accumulator through a passage 83 and the transfer passage lateral 63. Pump 82 comprises a cylinder 84 inserted endwise into a bore 85 extending axially into the right end of the wall 86 of the ram cylinder 49. The left end of this pump cylinder 84 contains a discharge passage 87 which communicates through a check valve 88 with the pump delivery passage 83. A plunger 89 reciprocable in the pump cylinder 84 projects outwardly through a bearing hole 91 in the casing end plate 52 and through a clearance hole 92 into an eccentric receiving chamber 93 of the casing cap 36. The outer end of the plunger 89 is pressed against an operating eccentric 94 therefor by a spring 95. This eccentric 94 is formed upon the mid-portion of a shaft 96, Figures 2 and 4, and rotatable therewith about an axis $a$—$a$ seen as a point in Figure 2. The outer ends of the shaft 96 contain respective square recesses 97′, Figure 4, into which a crank device (not shown) is selectively insertable, when associated protector caps 98 and 98′ are removed, for rotating such shaft and the eccentric 94 and thus effecting pumping excursions of the pump plunger 89. Normally, however, after the accumulator 58 has been loaded with fluid to the desired pressure, the pump operating eccentric 94 will be maintained in the position illustrated in Figure 2 and operation of the pump will depend upon an automatic functioning thereof attendant to periodic axial excursions or retraction-advancement cycles of movement of the ram 48 pursuant to random retractions and advancements of the track idler assembly 16.

In Figure 4 where the pump 82 is shown to an enlarged scale, the plunger 89 can be seen to have an axial bore 101 communicating inwardly through its left end from the pump chamber 102 in which the spring 95 is disposed. A transverse portion 103 of the passage 101 communicates with the bore 104 of the pump cylinder 84 rightward of the plunger head 105 and then with the interior of the reservoir 34 through a recess passageway 106 closed by the cylinder head plate 52 and a fluid inlet tube 107 of a fluid filter device 108.

*Service preparation and operation of the track tensioning apparatus shown in Figures 1 through 6*

While the closure plug 78 for the casing side wall opening 77 is removed, Figures 1, 2 and 5, the axially fluted spring reaction plug 74 for the pressure limiting valve 71 will be rotated in the threaded bore 72 to adjust the tension of the spring 73 of such valve so that only a predetermined maximum pressure of fluid is attainable in the hydraulic fluid accumulator 58. The ram chamber vent plug 81, Figure 5, will be removed from seat 80. Also while the plug 78 is removed the reservoir casing 34 will be supplied through the opening 77 with a hydraulic fluid such as oil. The hydraulic fluid in the left end portion of the reservoir casing 34 will flow past the piston-like force-reaction element 42 through the passage 40 shown in the lower part of Figure 2 into the right end of the casing while the passage 40 in the upper side of the element 42 provides for breathing between the opposite ends of the reservoir 35 so the fluid can attain a common level throughout the casing.

Next a faceted wrench member (not shown) will be inserted into a socket 99 of the closure plug 98, Figures 1 and 4, and this plug removed to provide access to the recess 97 in the rotatable pump operating member 96. In the apparatus on the other side of the tractor the plug 98', Figure 4, would be removed by inserting a wrench in the socket 99', to expose the crank-receiving socket 97' in the other end of the rotatable pump operating member. A cranking instrumentality (not shown) is then inserted into the socket 97 of the crank member 96 and this member rotated to revolve its eccentric 94 against which the right end of the pump plunger is pressed by the pump spring 95, Figure 4, to cause reciprocation of the pump plunger 105. Pursuant to each retractive stroke of the pump plunger 105, that is, rightward as viewed in Figure 4, hydraulic fluid which had entered through the filter 108, the tube 107, passage 106 and 104 flows through the plunger passages 103 and 101 past the check valve 102a into the pump chamber 102. Attendant to the ensuing leftward or pumping stroke of the plunger 105, additional fluid flows in through the filter 108, tube 107 and passages 106, 104 and 103, while the fluid in the chamber 102 is discharged forcibly through the check valve 88 and passages 83 and 63 into the hydraulic accumulator 58. When the fluid in the accumulator 58 and the air cushion in such accumulator above the fluid level 61 therein reach a nominal pressure sufficient for unseating the check valve 66, fluid will commence to flow through such check valve into the ram chamber 57. Since the bleed passage 79, Figures 5 and 6, is now open, as the fluid level rises in the ram chamber air above the fluid can escape through the passage 79 into the casing 34 or into the atmosphere while the casing plug 78 is removed. When fluid begins to spew from the upper end of the passage 79, the operator will know that the ram chamber 57 is completely filled with the hydraulic fluid and all air has been displaced therefrom. The plug 81 will then be replaced in the bleed passage 79, whereupon the operator will resume rotation of the pump operating crank member 96 to pump fluid from the reservoir 34 through the passage 83 past the check valve 65 into the ram chamber 57 until the pressure in this chamber attains a proper magnitude for forcing the ram plunger 54, its stem 26 and the front idler assembly 16 far enough forwardly to create the desired tension in the endless track 12. Meanwhile the air in the upper part of the accumulator 58 will be compressed to a pressure substantially equalizing that in the ram chamber 57. The spring reaction member 74 for the pressure limiting valve 71 will then be adjusted for limiting the pressure in the accumulator to that for causing said proper magnitude of pressure in the ram.

The pressure of fluid in the ram chamber 57 will at this time be a nominal pressure only sufficient to force the front idler assembly 16 far enough forwardly to eliminate over-looseness in the track 12 without actually creating a pronouncedly taut condition of the track. This hydraulic pressure is insufficient to cause the reaction pressure from the front idler assembly to push the hydraulic ram cylinder and the force-reaction element 42 rearwardly from the snap ring stop element 46a against the force of the force-reaction spring means 44, 45.

When, in the course of operation of the tractor, a non-compressible object becomes wedged between the track and any of the rollers 28, the sprocket 13 or the front idler wheel 15, the tension in the track will be greatly increased, but because of the retractability of the idler assembly 16, no injury will normally occur to the track. Pursuant to this retraction of the idler assembly the entire hydraulic ram 48 will be forced backwardly because of the non-compressible fluid column body between the plunger 54 and the rear cylinder wall 51. As soon as the transient over-tension condition of the track 12 has terminated the force-reaction spring means 44, 45 will advance the hydraulic ram 48 forwardly to its normal position wherein the member 42 reengages the stop ring 46a. Meanwhile the check valve 65 will have prevented the loss of any fluid from the ram chamber 57 so the idler assembly 16 will be returned to the normal position shown in Figure 1. Attendant to this retraction-advancement cycle of movement of the ram 48, the pump plunger 89 will have remained in contact with the crank eccentric 94 so that as the ram cylinder 49 and the pump cylinder 84 retracted leftward, as viewed in Figures 2 and 4, the pump chamber 102 will have expanded to have drawn a charge of fluid thereinto past the check valve 102a. During the ensuing advancement half cycle of the ram 48 and the idler assembly 16 under the force of the force-reaction spring means 44, 45, the pump plunger 89 will have forced the fluid from the pump chamber 102 past the check valve 88 and into the fluid transfer passage 62 communicating between the accumulator 58 and the ram chamber 57, and if the hydraulic pressure in the accumulator 58 was still at the maximum pressure allowed therefor by the pressure limiting means 71, the fluid thus forced into the transfer passage 62 by the pump 82 will simply be discharged past the pressure limiting means 71 and back to the reservoir. If, however, there had been loss of fluid from the ram chamber 57 and the consequent diminution of pressure in this chamber had permitted replacement of this lost fluid from the accumulator past the check valve 65 and thus caused the fluid pressure in the accumulator to drop below its maximum, at least part of the fluid delivered by the pump 82 would have flowed into the accumulator for maintaining its maximum pressure.

Although the track idler assembly 16 is retractable occasionally under the somewhat severe circumstances just explained, and such retraction-advancement cycle of movement of the idler assembly and of the hydraulic ram 57 actuates the pump 82 automatically for adding to the fluid supply of the accumulator 58 in the event the accumulator pressure is below the maximum limit determined by the pressure limiting means 71, other circumstances more regularly cause a retraction-advancement cycle of the track idler assembly to operate the pump 82 at sufficiently frequent intervals to normally assure pressure in the hydraulic accumulator 58 at substantially the maximum pressure permitted by the pressure limiting means. Each time the track driving sprocket 13 is rotated in a reversed direction for driving the vehicle rearwardly, and while rearward movement of the vehicle is resisted by a pushed or towed load, the sprocket 13 tends to climb up the rear end of the track loop and thus creates an inordinate tension in the upper flight 31 and this is sufficient to retract the idler assembly 16 together with the ram 48. When this inordinate tension is terminated in the upper track flight the force-reaction spring means 44, 45 will again restore the ram and the front idler structure 16 to the normal position illustrated in Figures 1 and 2. Meanwhile the pump 82 will have been operated for transferring a quantity of fluid from the casing reservoir 34 into the accumulator 58 or past the pressure limiting means 71 if the accumulator was already at its maximum pressure.

*Description of the Figure 7 embodiment of the invention*

In the embodiment of the invention shown schematically in Figure 7, pressure limiting means in the form of an adjustable pressure limiting valve 111 associated with a chamber 112 of a pump 113 limits the pressure of fluid deliverable by the pump through a check valve 114 to an accumulator 115 and in this way selectively limits the pressure of fluid in this accumulator.

In this second embodiment of the invention the track frame is designated 116 whereas the front idler assembly, designated 117, has a front idler 118 urged forwardly by a plunger 119 of a hydraulic ram 121. The cylinder 122 of this ram is provided with a fluid-containing chamber 123 with which the hydraulic accumulator 115 is communicative through a passage 124 containing a check valve 125 which permits the flow of fluid only from the accumulator to the ram chamber. The pump 113 delivers fluid from its chamber 112 past a check valve 114 in the passage 126 into the accumulator 115. Communication from a reservoir 127 to the pump chamber 112 is through an inlet passage 128 and past a check valve 129. A spill passage 131 conveys fluid escaping past the pressure limiting valve 111 back to the reservoir.

The ram 121 is normally held in an advanced position shown with a flange 130 thereof in abutment with a stop member 132 mounted upon the track frame 116 by an elastic force-reaction spring means 133 which reacts against a track frame mounted member 134. A tubular plunger 134a of the pump 113 is supported by the spring reaction seat member 134.

*Operation of the Figure 7 apparatus*

Pursuant to leftward retraction of the front idler assembly 117, the hydraulic ram plunger 119 acting through the solid column of fluid in the ram chamber 123 will retract the ram cylinder 122 against the force of the force-reaction means 133 attendant to the flange 130 on the front end of the cylinder departing rearwardly from the frame mounted stop member 132. The check valve 125 prevents displacement of any of the fluid column in the ram chamber 123 surging into the accumulator 115 when such fluid column is subjected to the inordinate transient pressure exerted leftward by the ram plunger 119. The pump chamber 112 is contracted by the cylinder 122 as it slides leftward on the pump plunger 134a. If at this time the pressure of fluid in the accumulator 115 is below the maximum pressure determined by the pressure limiting valve 111, fluid will be displaced past the check valve 114 into the accumulator for restoring the pressure therein to this maximum limit. If, on the other hand, the pressure in the hydraulic accumulator is at the maximum limit therefor the contracting pump chamber 112 will simply displace the fluid therefrom past the pressure limiting valve 111 and through the spill passage 131 back to the reservoir 127. Attendant to the idler assembly 117 being relieved of the force which had retracted it leftward, the force-reaction spring means 133 will be effective for pushing the cylinder 122 and the idler assembly forwardly until the flange 130 on the front end of the ram cylinder abuts against the stop 132. As the cylinder moves forwardly in this manner the pump chamber 112 will be expanded, diminishing the pressure therein and causing it to draw fluid from the reservoir 127 through the delivery passage 128 and past the check valve 129.

Any temporary diminution of the fluid pressure in the hydraulic ram chamber 123 as by escape of fluid past the ram plunger 119, will be supplied by the accumulator 115 through the check valve 125. Eventually when the ram 121 is retracted in the above described manner and subsequently again returned to the position illustrated in Figure 7, the pump 113 will have been operated for restoring the maximum pressure condition of fluid in the accumulator 115. This maximum pressure is selectable by manual adjustment of a screw reaction plug 135 for a spring 136 which urges a seatable member 137 of the pressure limiting valve 111 against a seat 138.

Having thus described a limited number of embodiments of the invention with the view of clearly and concisely illustrating the same, I claim:

1. In a track-tensioning apparatus for an endless track mounted on a crawler tractor track frame and trained about a track idler assembly retractively advanceable lengthwise of the frame to exert tensioning force against the track, a force-reaction structure on the frame in spaced relation in a retractive direction axially thereof from said idler assembly and elastically retractable from a normally occupied advanced position on the frame, an hydraulic ram comprising a fluid-containing chamber and reactable through a body of hydraulic fluid in such chamber between the force-reaction structure and the idler assembly to cause advancement of the idler assembly for exerting tension in the track of a magnitude constituting a function of the pressure of fluid in the ram chamber, the idler assembly being retractable attendant to exerting force through the ram and the fluid body therein to retract the elastically retractable force-reaction structure, an hydraulic fluid accumulator, pressure limiting means communicating with the accumulator for conducting fluid therefrom and thus limiting the fluid pressure in the accumulator to a maximum, a fluid transfer passage communicative between the accumulator and the ram chamber, a check valve in such passage to prevent flow of fluid therethrough from the chamber to the accumulator, a reservoir for hydraulic fluid, and pump means communicative with the reservoir and the accumulator and operable under control of the idler assembly to pump fluid from the reservoir into the accumulator attendant to the execution of retraction-advancement cycles of such assembly.

2. In a track-tensioning apparatus for an endless track mounted on a crawler tractor track frame, a track idler assembly advanceable lengthwise of the frame to exert tensioning force against the track and also retractable responsively to an inordinate increase of the track tension, an elastically retractable force-reaction structure in the frame in spaced relation in a retractive direction axially thereof from the idler assembly and including an hydraulic ram cylinder extending endwise toward such idler assembly, stop means precluding advancement of the structure beyond a normally occupied advanced position on the frame, a ram plunger complementing the cylinder to form a ram and reacting against the idler assembly for movement therewith lengthwise of the frame and projecting reciprocally into the cylinder for endwise adjustment therein, a reservoir for hydraulic fluid, an accumulator adapted to receive such fluid, pressure limiting means communicating with the accumulator for limiting the pressure therein to a maximum, a fluid transfer passage communicating between the accumulator and said cylinder, a check valve in said passage accommodating flow of fluid therethrough only from the accumulator into the cylinder, a pump comprising parts operable under control of movement of the ram, said pump being communicative with the reservoir and with the accumulator and adapted to receive a charge of fluid from the reservoir attendant to retractive movement of the ram by the idler assembly and being adapted to discharge fluid into the accumulator attendant to subsequent advancement movement of the ram as the force-reaction structure recovers to its advanced position.

3. In a track-tensioning apparatus for an endless track mounted on a crawler tractor track frame and trained about a track idler assembly retractively advanceable lengthwise of the frame to exert tensioning force against the track, elastically compressible force-reaction means on the frame in spaced relation in a retractive direction axially of such frame from the idler assembly, an hydraulic ram comprising a fluid-containing chamber and reactable through a body of hydraulic fluid in such chamber between the force-reaction means and the idler assembly to cause advancement of the idler assembly for exerting tension in the track of a magnitude constituting a function of the pressure of fluid in the ram chamber, the force-reaction means being operable to advance the ram and the idler assembly against said stop, the idler assembly being retractable attendant to exerting force through the ram and the fluid body therein to retract such ram from the stop attendant to compressing the force-reaction means, an hydraulic fluid accumulator, pressure limiting means communicating with the accumulator for conducting fluid therefrom and thus limiting the fluid pressure in the accumulator to a maximum, conduit means communicative between the accumulator and the ram chamber, a check valve in such conduit means to prevent flow of fluid from the chamber to the accumulator, a reservoir for hydraulic fluid, and pump means communicative with the reservoir and the accumulator and operable under control of the idler assembly to pump fluid from the reservoir into the accumulator attendant to the execution of retraction-advancement cycles of such assembly.

4. In a track tensioning apparatus for an endless track mounted on a crawler tractor track frame and trained about a track idler assembly retractively advanceable lengthwise of the frame to exert tensioning force against the track, an hydraulic ram comprising a fluid-containing chamber, said ram being in force exerting relation with the idler assembly and being operable while in an advanced position axially of the track frame to cause advancement of the idler assembly for exerting tension in the track of a magnitude constituting a function of the pressure of fluid in the ram chamber, force-reaction means against which the ram reacts to be normally maintained thereby in the advanced position, but the force-reaction means being elastically displaceable to accommodate retraction of the idler assembly and the ram when subjected to an increased reactive force imparted thereto by the track pursuant to a transient condition of inordinate track tension, the force-reaction means being operable to restore the ram to its advanced position following termination of the inordinate track tension, an hydraulic fluid accumulator having a transfer passage through which such accumulator is communicative with the ram chamber and adapted to contain fluid at an operating pressure of a magnitude effective through such passage for imposing on the fluid in the ram chamber a pressure for creating a desired tension in the track, a reservoir for hydraulic fluid, and pump means communicative between the reservoir and the accumulator operable pursuant to retraction-advancement cycles of movement of the ram to pump fluid from the reservoir to the accumulator to create such operating pressure of the fluid therein.

5. The combination set forth in claim 4, wherein the hydraulic fluid accumulator is operable to displace a portion of the fluid at the operating pressure thereof through said transfer passage into the ram chamber to substantially maintain said desired pressure therein despite expansion of the chamber pursuant to service wear expansion of the track, and wherein the pump is operable to replace such displaced fluid by fluid from the reservoir.

6. The combination set forth in claim 5, wherein there is a check valve in said passage for precluding reverse flow of the fluid through such passage from the ram.

7. The combination set forth in claim 4, wherein there is pressure limiting means for the accumulator that is adjustable for selective determination of the maximum operating pressure of the fluid therein to determine the magnitude of pressure in the ram chamber and the track tension.

8. The combination set forth in claim 4, wherein the hydraulic fluid accumulator is disposed on the hydraulic ram for movement therewith.

9. The combination set forth in claim 4, wherein the hydraulic ram comprises a cylinder reacting against the force-reaction means and a plunger reacting between the idler assembly and the fluid in the ram chamber, wherein the cylinder has an end wall disposed axially oppositely from the plunger, and wherein the accumulator is disposed on such cylinder end wall.

10. The combination set forth in claim 4, wherein the pump comprises a component carried by the ram for retractive-advancement movement therewith, and a component disposed for relative immobility during such movement of the ram-carried component.

11. The combination set forth in claim 10, wherein the pump components are relatively movable for performing pumping action of the pump while the ram is at rest, and wherein there is means operable at will for effecting such relative movement of said components.

12. The combination set forth in claim 4, wherein the fluid-containing chamber of the hydraulic ram has a wall, and wherein the pump comprises a bore in such wall that extends longitudinally of the track frame, a pump plunger movable axially in said bore for causing operation of the pump, and means constraining the plunger to react against the track frame so the bore moves with the ram relatively to the plunger for operating the pump pursuant to said retraction-advancement cycles of movement of the ram.

13. The combination set forth in claim 4, wherein the fluid-containing chamber of the ram has a wall, and wherein the pump comprises a pump-chamber bore in such wall that extends longitudinally of the track frame and having an outer end where such bore emerges from the wall, a plunger-reciprocating device mounted on the track frame adjacent such outer end of the bore, a pump plunger reciprocable axially in said bore for causing operation of the pump, and means constraining the plunger to react through said device against the track frame so the bore moves with the ram relatively to the plunger for operating the pump pursuant to said retraction-advancement cycles of movement of the ram, and said plunger-reciprocating device being operable at will for reciprocating the plunger.

References Cited in the file of this patent
UNITED STATES PATENTS

| | | |
|---|---|---|
| 1,777,130 | Rode | Sept. 30, 1930 |
| 2,322,977 | Schroder et al. | June 29, 1943 |